US012808457B2

(12) United States Patent
Garlock et al.

(10) Patent No.: US 12,808,457 B2
(45) Date of Patent: Nov. 24, 2026

(54) VALVE PACKING RING SET

(71) Applicant: EGC Operating Company LLC, Chardon, OH (US)

(72) Inventors: Robert Garlock, Chardon, OH (US); Brian Biller, Chardon, OH (US); Thom Jessup, Chardon, OH (US)

(73) Assignee: EGC OPERATING COMPANY LLC, Chardon, OH (US)

( * ) Notice: Subject to any disclaimer, the term of this patent is extended or adjusted under 35 U.S.C. 154(b) by 0 days.

(21) Appl. No.: 18/935,019

(22) Filed: Nov. 1, 2024

(65) Prior Publication Data

US 2025/0146598 A1 May 8, 2025

Related U.S. Application Data

(60) Provisional application No. 63/595,938, filed on Nov. 3, 2023.

(51) Int. Cl.
*F16K 41/02* (2006.01)
*F16J 15/30* (2006.01)

(52) U.S. Cl.
CPC ............... *F16K 41/02* (2013.01); *F16J 15/30* (2013.01)

(58) Field of Classification Search
CPC .. F16K 41/02; F16K 41/04; F16J 15/30; F16J 15/185; F16J 15/28
See application file for complete search history.

(56) References Cited

U.S. PATENT DOCUMENTS 1,871,820 A * 8/1932 Morton .................... F16J 15/28 184/18
4,328,974 A * 5/1982 White ...................... F16J 15/20 277/540
4,892,320 A 1/1990 Tiickmantel
5,225,379 A * 7/1993 Howard .................. F16K 41/04 501/99
5,238,252 A * 8/1993 Stewen ................... F16K 41/02 251/330
5,478,048 A 12/1995 Salesky et al.
6,167,902 B1 * 1/2001 Nelson .................... F16K 31/50 251/274

(Continued)

FOREIGN PATENT DOCUMENTS

| | | | |
|---|---|---|---|
| CN | 203614748 | U | 5/2014 |
| EP | 0494064 | A1 | 7/1992 |
| JP | 11166628 | A * | 12/1997 |

OTHER PUBLICATIONS

The International Search Report and the Written Opinion of the International Searching Authority, or the Declaration from the related PCT application No. PCT/US2024/054181, Date of Mailing Jan. 27, 2025, 16 pages.

*Primary Examiner* — Eugene G Byrd
(74) *Attorney, Agent, or Firm* — Shumaker, Loop & Kendrick, LLP; James D. Miller

(57) ABSTRACT

One or more packing systems and/or methods of manufacture are disclosed for a valve seal with lowered emissions while being complaint with fire standards. The packing system may have alternating mid-layers, a top layer, a bottom layer, and a first end cap and a second end cap. The layers can be formed of a flexible graphite-based material and/or a metal and/or non-fluoropolymer material. The layers may be bonded together and expand under compression to form a seal between a valve stem and a stuffing box.

22 Claims, 15 Drawing Sheets

(56) References Cited

U.S. PATENT DOCUMENTS

| | | | | |
|---|---|---|---|---|
| 11,746,925 | B2 | 9/2023 | Garlock et al. | |
| 2005/0082766 | A1* | 4/2005 | Lovell | F16J 15/3284<br>277/510 |
| 2014/0125012 | A1* | 5/2014 | Lee | F16J 15/30<br>277/500 |
| 2014/0197342 | A1* | 7/2014 | Kung | F16J 15/24<br>251/214 |
| 2014/0264129 | A1* | 9/2014 | Grabau | F16K 25/005<br>251/324 |
| 2014/0314346 | A1* | 10/2014 | Thoma | F16J 15/30<br>384/16 |
| 2016/0109035 | A1* | 4/2016 | McCarty | F16K 41/02<br>277/517 |
| 2018/0087685 | A1* | 3/2018 | Baumann | F16K 41/02 |
| 2019/0293206 | A1* | 9/2019 | Mahoney, Jr. | B21D 53/20 |
| 2023/0175609 | A1* | 6/2023 | Ko | F16K 41/02<br>251/218 |
| 2023/0213406 | A1* | 7/2023 | Glaun | F16K 41/04<br>73/40.5 R |
| 2025/0314299 | A1* | 10/2025 | Azibert | F16J 15/184 |

* cited by examiner

SECTION A-A

SECTION B-B

VALVE PACKING RING SET

CROSS-REFERENCE TO RELATED APPLICATIONS

This application claims priority to U.S. Provisional Ser. No. 63/595,938, entitled VALVE PACKING RING SET, filed Nov. 3, 2023, all of which is incorporated herein by reference.

BACKGROUND

Valve systems for controlling the flow of fluids have a valve stem that is capable of being moved between open and closed positions. In most cases, the valve is provided with a valve stem that extends through the valve body. In order to reduce leakage, or emissions, between the valve stem and the valve body, a packing system may be employed that encircles the valve stem, and seals the area between the packing box and the valve stem. Packing systems may have layers of packing rings which, when subjected to axial compression, are urged to expand radially into sealing engagement with the enclosing cylindrical surfaces of the valve body and stem. The packing system should also allow the valve stem to open and close, which can cause friction between the valve stem, packing system, and valve body. The level of stress, or axial compression, and friction influences the life span of the packing system, due to increased wear potential.

Many fugitive emissions compliant packing rings for valve stems incorporate sealing materials such as rubber or rubber-like material, plastic, and in many cases lubricant materials. These materials, however, may not be compliant with certain fire standards and may not have temperature ratings acceptable for refinery or other high temperature applications.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

One or more systems and techniques described herein are provided that can be used to seal a valve system. As described herein, a valve packing system is disclosed that may not need as much load as current valve packing systems to provide adequate sealing. Further, such a packing system may provide for less friction to the stem of the valve system during operation, and can utilize materials that are suitable for a wide range of fluids to extend operating conditions, such as increased operational pressure, and temperature ranges. For example, the valve packing systems described herein are more consistent and reliable for sealability, compressibility, and recovery, and can be configured for use in a broader range of applications and operations.

In one implementation, a packing ring is provided that comprises a plurality of mid-layers, where respective mid-layers comprising a flexible graphite material or a non-graphite, non-fluoropolymer material. Further, the packing ring can comprise a top layer and a bottom layer, where both the top layer and the bottom layer can comprise a flexible graphite material, or other carbon material. In this implementation, the mid-layers are disposed between the top layer and the bottom layer, and the mid-layers comprise alternating layers of the flexible graphite material and the non-graphite, non-fluoropolymer material, wherein respective layers are disposed parallel to an adjoining layer. The plurality of mid-layers, top layer, and bottom layer can be bonded together and formed into a cylindrical shape, with an open center. The open center can extend through the plurality of mid-layers, top layer, and bottom layers and has an axis perpendicular to the plurality of mid-layers, top layer, and bottom layer. The flexible graphite (e.g., foil) layers are perpendicular to the cylindrical axis, as opposed to being oriented more parallel to the axis (e.g. as in die-molded flexible graphite rings)

In another implementation, the packing ring forms an interference fit between the valve stem and a stuffing box in which the valve stem is disposed. In yet another implementation, a method of manufacturing a packing ring comprises placing a first layer of flexible graphite material on a first surface of a first layer of non-graphite, non-fluoropolymer material, wherein the non-graphite, non-fluoropolymer material has a second surface opposing the first surface, placing a second layer of flexible graphite material on the second surface of the non-graphite, non-fluoropolymer material, and bonding the layers together, and formed into a cylindrical shape. In this implementation, the bonded combination of the non-graphite, non-fluoropolymer layer and the flexible graphite material can be utilized as a mid-layer packing ring in seal for a valve system.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings.

DETAILED DESCRIPTION

Figure 1A:
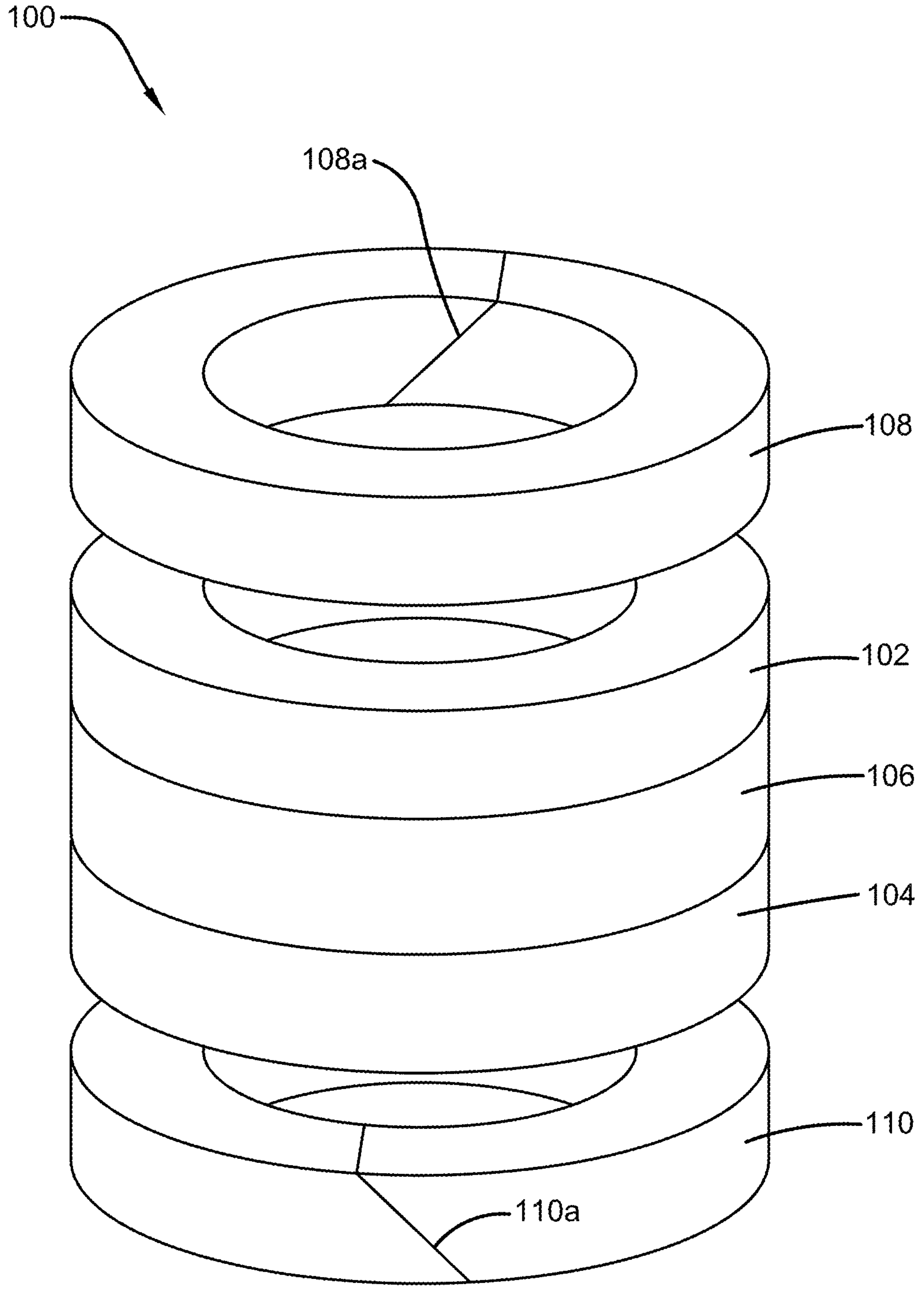
FIG. 1A is a component diagram illustrating a perspective view of an exemplary implementation of a packing ring system.
Figure 1C:
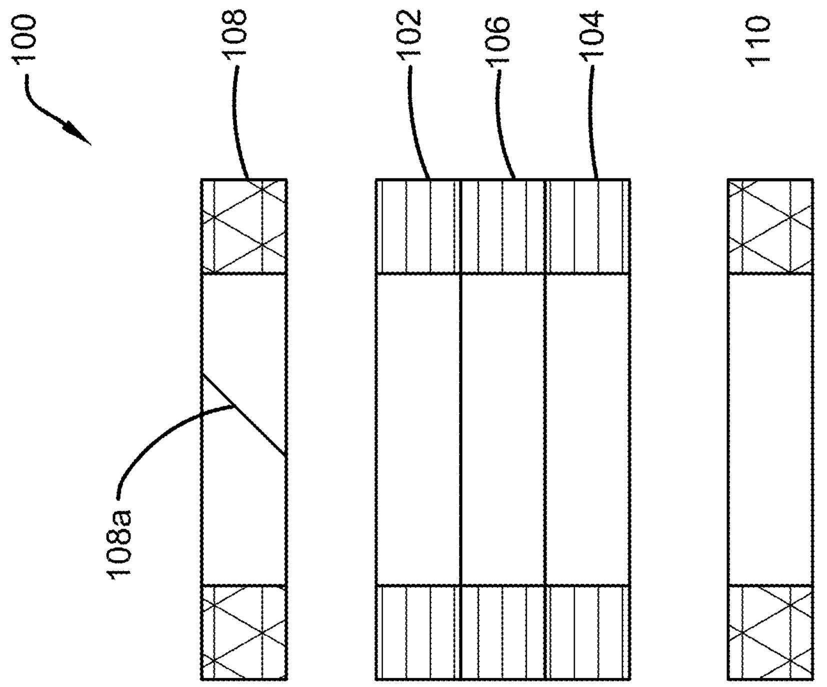
FIG. 1C is a component diagram illustrating a bottom view of a packing ring system.
Figure 1B:
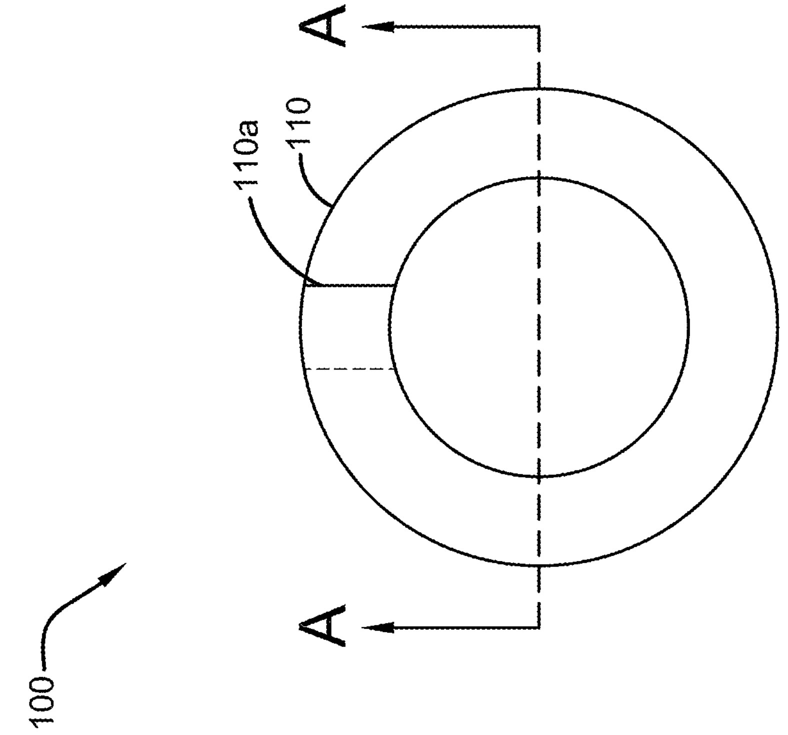
FIG. 1B is a component diagram illustrating a front side cut-away view of packing ring system.
Figure 2:
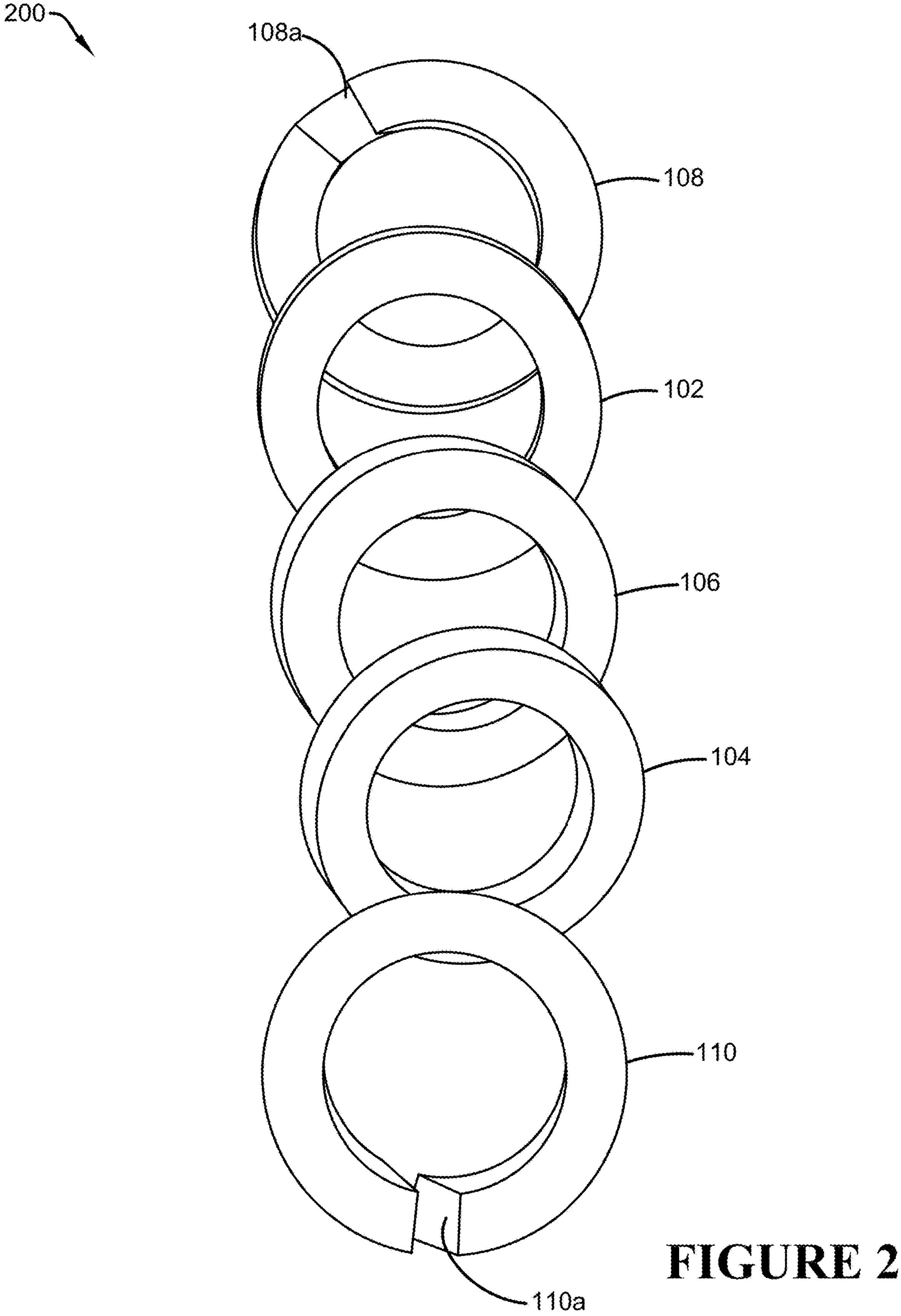
FIG. 2 is a component diagram illustrating an exploded-type view of an example packing ring system.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

The word "exemplary," if used herein, is to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Further, at least one of A and B and/or the like generally means A or B or both A and B. In addition, the articles "a" and "an" as used in this application and the appended claims may generally be construed to mean "one or more" unless specified otherwise or clear from context to be directed to a singular form.

The present disclosure relates to packing materials for mitigating the emission of fluids from a fluid valve, and more particularly, to a valve stem packing ring set for sealing between a valve stem and a stuffing box of a valve body, with reduced friction between the valve stem and packing ring set. The packing ring set disclosed herein provides for fluid emission level that meet Environmental Protection Agency (EPA) and other agency fugitive emission standards (API 622,624,641, ISO 15848, TA-LUFT, etc.), while still being compliant with fire standards (API 589, API 607, API 6FA, etc.), and reducing friction.

Many fugitive emissions compliant packing rings for valve stems incorporate fluoropolymer sealing materials such as polytetrafluoroethylene (PTFE). However, some applications may wish to use alternative materials to fluoropolymers. Fluoropolymers have recently become less desirable, as PFAs and PFOAs bioaccumulate in the environment. Health concerns over the effects of these contaminants have caused governing bodies to discuss legislation which limits or prohibits the use of some or all fluoropolymers and/or their byproducts.

Alternatively, as described herein, flexible graphite, other carbon materials, metals, and alternative polymers, when used in the correct combination, can be rated to temperatures of 850 °F (450 °C), which can satisfy both fugitive emissions standards, and fire safety standards. In addition, flexible graphite, other carbon materials, some metals, and other polymer materials can be chemically compatible with a wide range of fluids, making the combination suitable for most applications. Alternates to fluoropolymers, when used in combination with flexible graphite or other carbons, can have-similar desirable attributes, such as: elevated temperature resistance; good to excellent chemical compatibility; low permeability; a useful thickness of less than 0.015" (0.38 mm), or that may be applied in thicknesses less than 0.015' (0.38 mm); an ability to creep or flow when load is applied or high ductility metal; a low glass transition temperature or low temperature softening point (low melting point in metals); and can be non-toxic.

A flexible graphite and metal and/or alternative polymer packing, having horizontal layers of flexible graphite bonded to horizontal layers of a metal and/or alternate polymer may perform better to meet higher compliance standards, while being more durable than other packings currently available. In addition to the applications disclosed herein, such a packing system may be used for seat seals, body/bonnet gaskets, balance seals, and other sealing elements that have an axial load applied during operation, resulting in radial load and/or movement into adjacent valve components. As an example, some metals that may be used in such a packing material can include, but are not limited to, Indium, Aluminum, Bismuth, Gold, Platinum and Silver, copper, and combinations thereof. As another example, some alternate polymers (to PFAs) that may be used in such a packing material can include, but are not limited to polyetheretherketone (PEEK), polybenzimidazole (PBI), polyetherimide (PEI), Polyphenylene sulfide (PPS), Silicones, and combinations thereof.

FIGS. 1A, 1B, 1C, and 2 are component diagrams illustrating a first exemplary implementation of a packing ring system 100 implementing one or more systems described herein. In this implementation, the packing ring system 100 comprises at least one mid-layer 106 and a top layer 102 and a bottom layer 104. The top layer 102, bottom layer 104, and mid layer 106 may be made of any suitable material for valve sealants, such as a graphite-based material and/or a metal and/or polymer material. For a graphite-based material, the material may be laminated and may have additives that exhibit various desirous properties that are chosen based on the application. Such properties may be anti-corrosion and enhanced flexibility properties. Specifically, the additives may actively or passively inhibit corrosion. One such additive may be a phosphorus, barium molybdate, and/or a zinc coating.

Regarding a metal and/or polymer material, the material chosen may exhibit various desirous properties that are chosen based on the application. In one example, the metal and/or polymer material can comprise Indium or PEI, which is capable of being melt processed, allowing the material to flow better at working temperatures and low pressure, thus allowing replenishment of the PEI at the seal interface during use and/or wear. Additionally, metal foil and/or PEI installed at ambient conditions may exhibit lower cold flow compared to other fluoropolymer materials at common preloads, which, during certain applications, can allow the graphite-based material in the seal to expand radially towards a target valve stem and stuffing box. In this example, the improved radial expansion can provide intimate contact between the valve components and any sealing foils or polymer materials that are present between flexible graphite layers. As an example, the flexible graphite density may be below 80 #/cu. ft. to more readily provide for enough axial to radial movement during compression.

In some implementations, the metal and/or alternate polymer material can be combined with the graphite-based material. As an example, metal foil and/or alternate polymer and graphite-based sealing material can be combined in a mold, and subjected to a pressurized heat-treatment and forming process, at an appropriate pressure and temperature, for an appropriate amount of time. The resulting product is a sheet or ring seal that is comprised of a graphite-based material infused with the metal and/or alternate polymer material. In this example, the resulting sheet or ring seal can be formed (e.g., precision cut) into a mid-layer ring 106 (e.g., and/or a top-layer 102, bottom layer 104) to be used in the exemplary packing ring system 100.

In some implementations, the packing ring system 100 may further be comprised of a first end ring 108 and a second end ring 110. The first end ring 108 can comprise a first skive cut 108*a*, and the second end ring 110 may comprise a second skive cut 110*a*. For example, skive cuts (e.g., 108*a*, 110*a*) may provide for easier assembly of the seal around a valve stem without needing to fully disassemble a portion of the valve. Further, the skive cuts (e.g., 108*a*, 110*a*) may also allow for these portions of the packings to be readily cut from a spool stock of material (E.g., formed as a single roll of stock packing material). The first end ring 108 and the second end ring 110 may be made of any suitable material for containing the top layer 102, bottom layer 104, and mid layer 106.

One such example of a suitable material is a flexible graphite material (e.g., rope like) that has a metal alloy wire jacketing knitted over it, which may be further dipped in a lubricant or non-fluoropolymer blocking agent. As an example, a nickel alloy, such as nickel alloy 600, may be in the form of a jacketed braided flexible graphite. This material may exhibit anti-extrusion properties, improved material containment properties, along with improved valve stem wiping functionality. Further, in some implementations, the skive cuts, 108*a* and 110*a*, can be cut at desired angle. For example, the skive cut 110*a* may be cut to a 45 degree angle. Further, as installed or in operation, the skive cut 108*a* may be offset from the skive cut 110*a* in operable installation in a valve system. For example, the skive cut 108*a* may be one-hundred and eighty degrees offset from the skive cut 110*a*.

As an alternate implementation, the suitable material used in the first end ring 108 and the second end ring may be an alternate carbon material (e.g., or other non-galling material). For example, a formed (e.g., machined, pressed, or otherwise formed) carbon (e.g., graphite) bushing may be utilized for these rings 108, 110. As another example, a carbon fiber ring may be used for the end rings 108, 110. As an example, the use of carbon for end rings, without the metal jacket, can provide for improved lubrication as carbon, such as graphite, is a self-lubricating material. Further, the use of the machined bushings or carbon fiber rings may improve the tolerances (e.g., reduce clearances) in the stuffing box, which can help to mitigate extrusion of the material of the packing seal when in use.

As an illustrative example, as illustrated in the implementation of FIGS. 1A, 1B, 1C, and 2, the exemplary valve packing ring system 100 is comprised of a top layer 102, a bottom layer 104, a mid-layer 106, a first end ring 108, and a second end ring 110. In this example, the top layer 102 and bottom layer 104 can respectively be made of a flexible corrosion-inhibited graphite material. In this example, the mid-layer 106 can be made of a polymer, such as PEI film (e.g., or a ring formed of a combined materials). In this example, the first end ring 108 and the second end ring 110 can be made of nickel alloy 600 jacketed, braided, corrosion inhibited graphite with an added non-fluoropolymer lubricant; or may be made of the carbon bushing or carbon fiber ring material. Alternately, one or more of the respective layers 102, 104, 106 may be comprised of the combined flexible corrosion-inhibited graphite material infused with the metal and/or alternate polymer material.

In another example, one or more techniques and methods can be used to produce the implementations of packing ring systems 100 illustrated in FIGS. 1A, 1B, 1C, and 2. In some implementations, the packing system 100 may be manufactured by placing the top layer 102 on top of the mid layer 106, and putting the bottom layer 104 underneath the mid layer 106. The layers 102, 104, and 106, may be lined up, and then each layer bonded together. The first end ring 108 and second end ring 110 may further be bonded to the top of the top layer 102 and underneath the bottom layer 104.

In some implementations, a first layer of flexible graphite material can be placed on a first surface of a first layer of metal foil and/or alternate polymer material, where the metal and/or alternate polymer material has a second surface opposing the first surface. Further, a second layer of flexible graphite material can be placed on the second surface of the metal and/or alternate polymer material. Additionally, the layers can be bonded together using a heat treatment resulting in a flexible combined graphite-metal and/or alternate polymer sheet. As an example, bonding can be performed by applying an appropriate amount of compressive force that compresses the layers together. In other implementation, the layers can be disposed together and subjected to an appropriate temperature for an appropriate amount of time to bond the layers together. In some implementations, a combination of temperature and pressure (e.g., compressive pressure) can be used to bond the layers together. In some implementations, the heat treatment can be performed using application of force to the layers, which generates heat to bond the layers together.

In some implementations, multiple alternating layers of, polyetheretherketone (PEEK), polybenzimidazole (PBI), polyetherimide (PEI), Polyphenylene sulfide (PPS), Silicones and flexible graphite material can be bonded together to form the combined graphite-metal and/or alternate polymer sheet. Further, the resulting combined graphite-metal and/or alternate polymer sheet can be cut to form a packing ring that is configured to be used in the stuffing box of a target valve body. That is, for example, the combined graphite-metal and/or alternate polymer sheet can be die-cut to form a packing ring comprising an open center sized to operably fit around a valve stem of a target valve body, and diameter sized to fit inside a stuffing box of the target valve body to operably provide a seal at the valve stem.

The top layer 102, bottom layer 104, mid layer 106, first end ring 108 and second end ring 110 may be shaped and sized to create a seal around a valve stem. The top layer 102, bottom layer 104, and mid layer 106 may be sized similarly, to easily rest on top of each other. In one illustrative example, the top layer 102, bottom layer 104, and mid layer 106 may be about 0.1 to about 0.2 (e.g., preferably about 0.125) inches in height each, with an inner diameter of about 0.2 to about 0.8 (e.g., preferably about 0.438) inches, and an outer diameter of about 0.5 to about 1.0 (e.g., preferably about 0.675) inches. The first end ring 108 and the second end ring 110 may be sized similarly to evenly compress any inner layers. The first end ring 108 and the second end ring 110 may be the same size as the top layer 102, bottom layer

104, and mid layer 106, or it might be larger in size. For example, the first end ring 108 and the second end ring 110 may be about 0.2 inches in height each.

FIGS. 3A, 3B, 3C, 3D, 4, and 5 are component diagrams illustrating a second exemplary implementation of a packing ring system 300 implementing one or more systems described herein. In this implementation, the packing ring system 300 comprises at least three mid-layers 306, 308, and 310, a top layer 302 and a bottom layer 304. The top layer 302, bottom layer 304, and mid layers 306, 308, and 310 may be made of any suitable material for valve sealants, such as a graphite-based material or a polymer and/or metal material. For a graphite-based material, the material may be laminated and may have additives that exhibit various desirous properties that are chosen based on the application. Such properties may be anti-corrosion and enhanced flexibility properties.

For a metal material, the material chosen may exhibit various desirous properties that are chosen based on the application. In one example, the metal chosen can be one of: Indium, Aluminum, Bismuth, Gold, Platinum and Silver, copper, and the alternate polymer chosen can be one of: polyetheretherketone (PEEK), polybenzimidazole (PBI), polyetherimide (PEI), Polyphenylene sulfide (PPS), or Silicones which are capable of softening, allowing the material to exhibit improved flow characteristics at working temperatures, thus allowing replenishment of the polymer or metal at the seal interface during wear. As an example, during certain applications, this characteristic of the metal and/or alternate polymer when combined with the graphite-based material may allow the graphite material to expand radially, inward towards a valve stem, and outward toward the walls of the stuffing box.

In some implementations, the metal and/or alternate polymer material may be combined with the graphite-based material, such as in a heat-treatment and/or pressure forming process, resulting in a bonding of the mid-layers 306, 308, and 310 (e.g., and/or the top layer 302, bottom layer 304). That is, for example, the bonding process allows the various layers to bond together to form a cylindrical packing seal that is comprised of a graphite-based material infused with the metal and/or alternate polymer material. In this example, the bonded packing seal comprises an open enter to receive a target valve stem, and a diameter that is sized to fit into a target packing box. In some implementations, the open center is sized to provide a slight amount of clearance, or a slight amount of interference with the valve stem, for example, depending on the application. Further, the diameter of the bonded packing seal is sized to provide a slight amount of clearance, or a slight amount of interference with the walls of the stuffing box, for example, depending on the application.

Figure 3A:
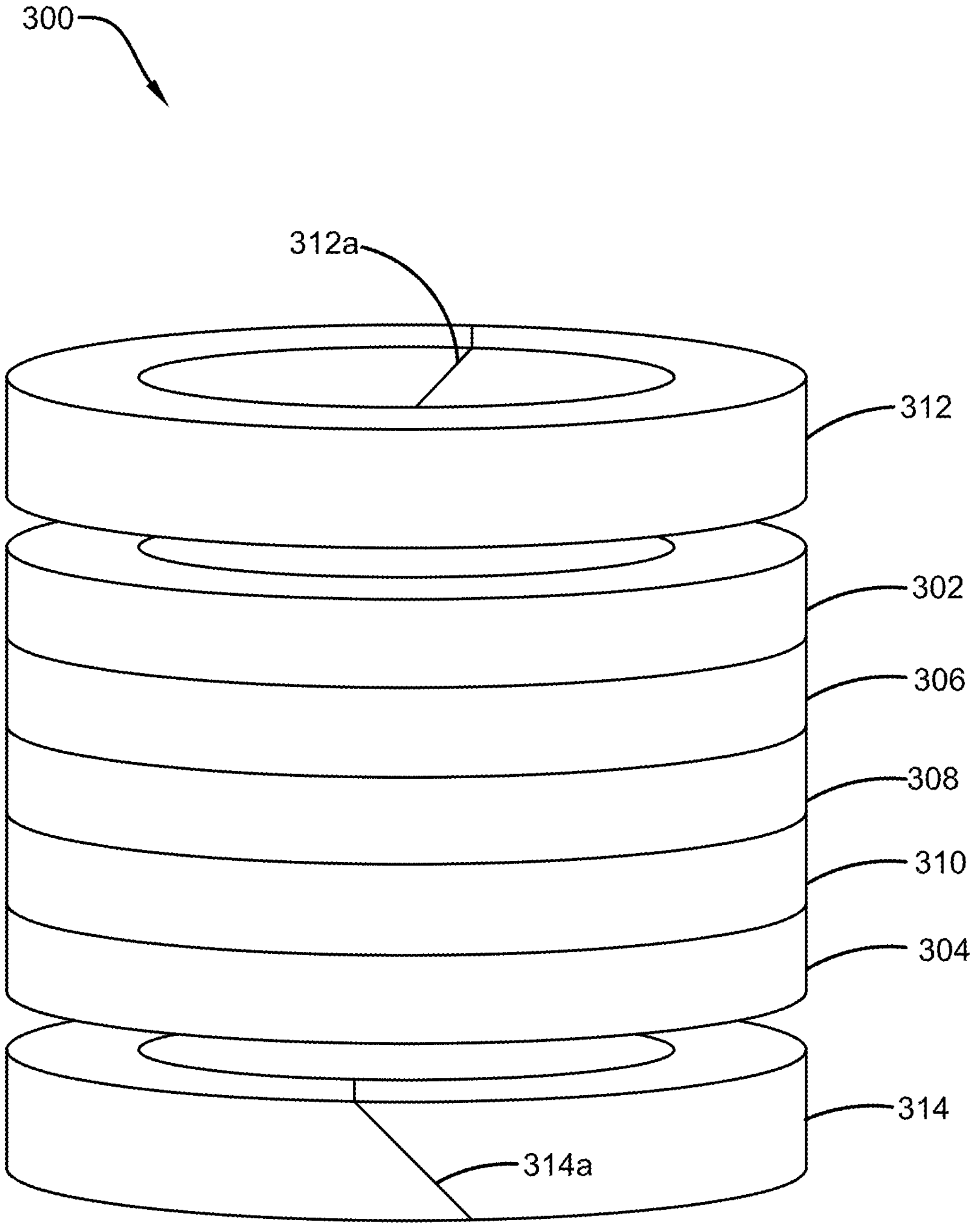
FIG. 3A is a component diagram illustrating a perspective view of an exemplary implementation of a packing ring system.
Figure 3C:
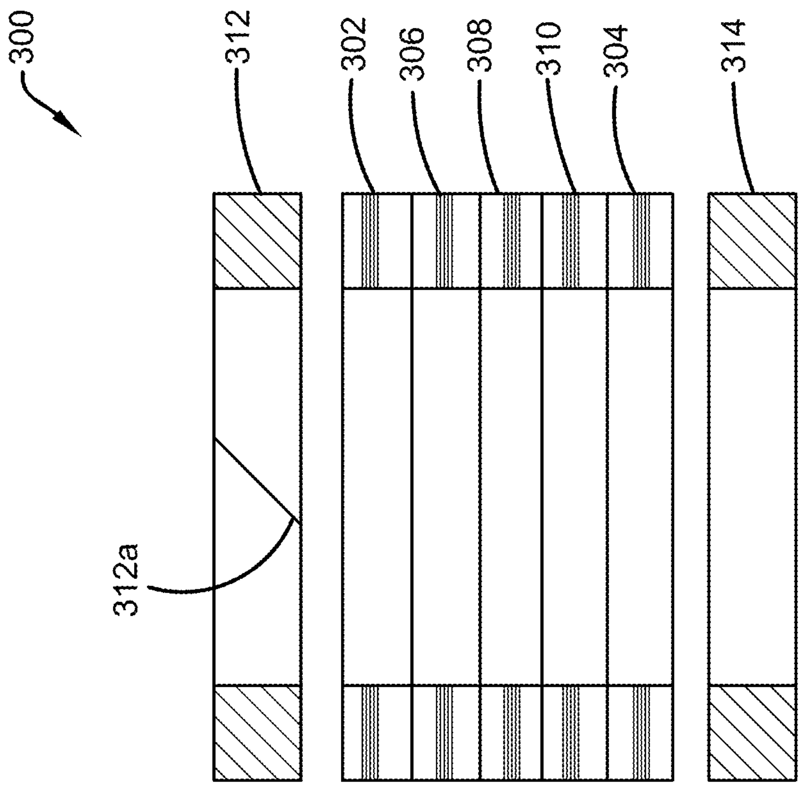
FIG. 3C is a component diagram illustrating a bottom view of a packing ring system.
Figure 3B:
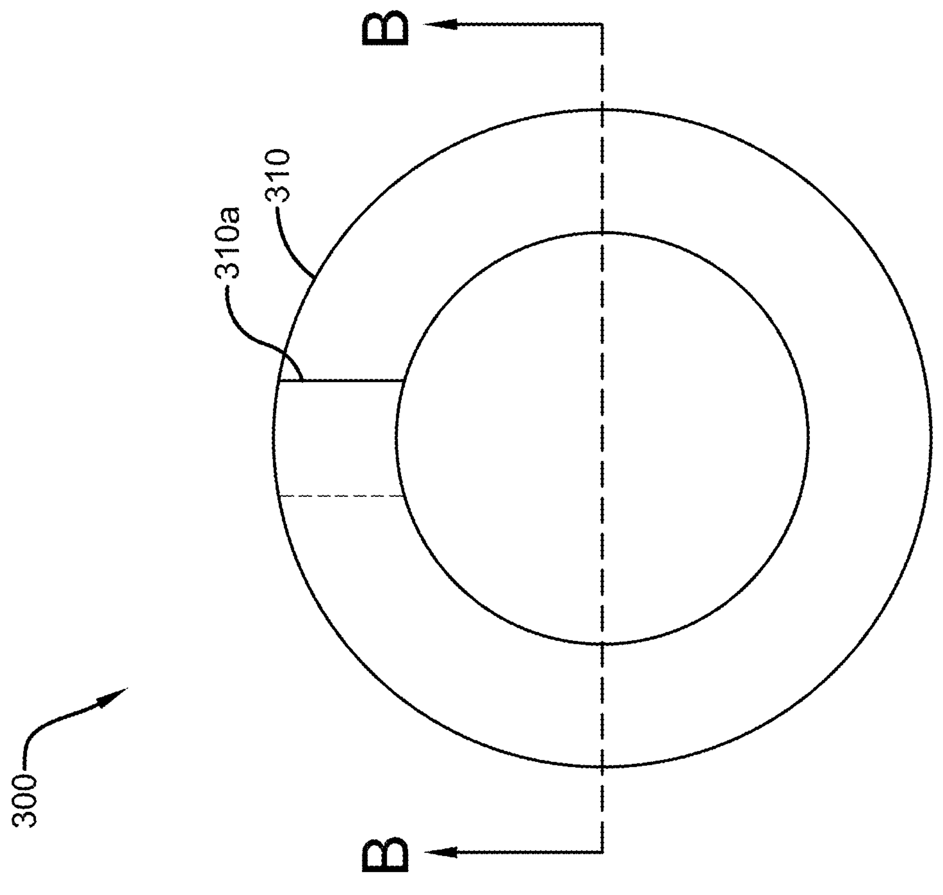
FIG. 3B is a component diagram illustrating a front side cut-away view of a packing ring system.
Figure 4:
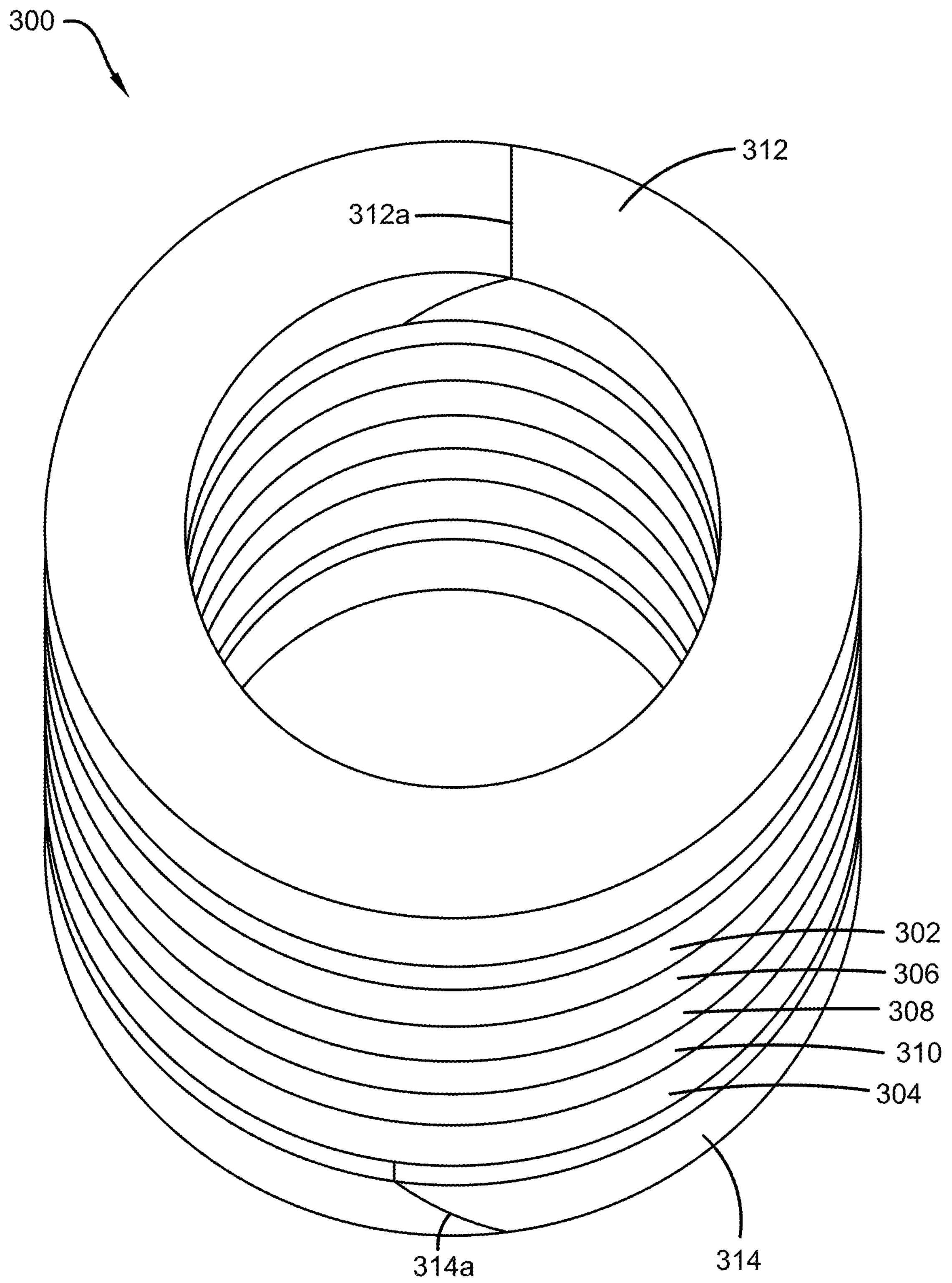
FIG. 4 is a component diagram illustrating a perspective view of the packing ring system.
Figure 8:
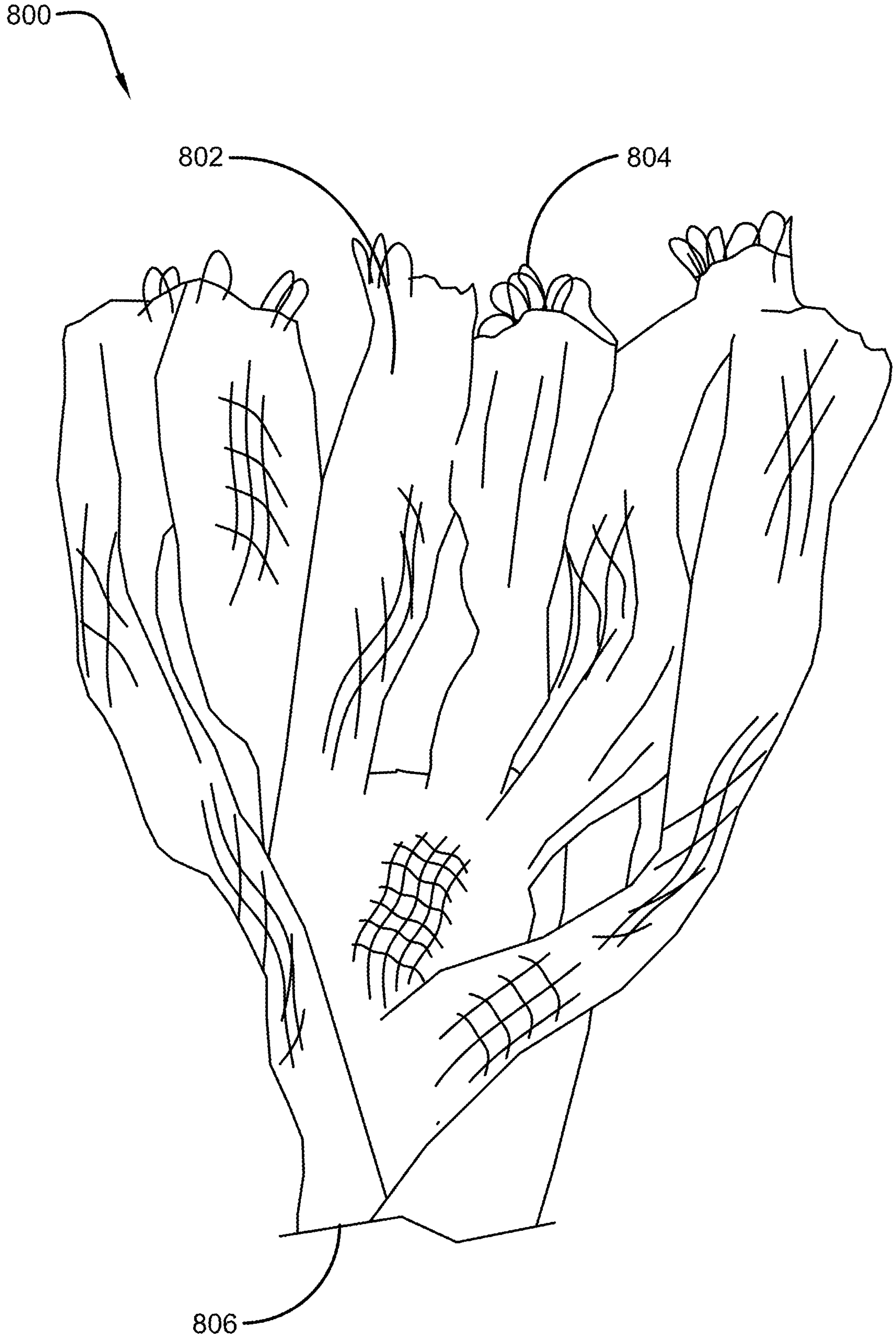
FIG. 8 is a photos of an example material knitted over and braided, and a method of manufacture.

As illustrated in FIGS. 3A, 3B, 3C, 3D, 4, and 5, the packing ring system 300 may further comprise a first end ring 312 and a second end ring 314. The first end ring 312 may have a skive cut at 312*a*, and the second end ring 314 may have a skive cut at 314*a*. The first end ring 312 and the second end ring 314 may be made of any suitable material for containing the top layer 302, bottom layer 304, and mid layers 306, 308, and 310, such as inside a target stuffing box during operation. As an illustrative example, as illustrated in FIG. 8, one such example of end ring material 800 is a flexible graphite material 802 that is knitted over with a metal alloy wire jacketing 804. As one example, a suitable end ring material may be a Nickel alloy 600 jacketed braided flexible graphite. This type of material may exhibit anti-extrusion properties, improved containment properties (e.g., packing ring and/or target fluid containment), and desired valve stem wiping functionality (e.g., clearing fluid from the valve stem as it is operated). Further, for example, the wire size of the wire jacketing can be about 0.004 inches in diameter to improve clarity. The skive cuts, 312*a* and 314*a*, may be cut at an angle to a desired angle. For example, the skive cut 314*a* may be cut to approximately 45 degrees. As an example, as illustrated in FIGS. 3A and 4, when operably installed in a target valve system, the skive cut 312*a* may be offset from the skive cut 314*a*. For example, the skive cut 312*a* may be approximately 180° offset from the skive cut 314*a*.

Alternatively, as another example, one such example of end ring material 800 is a carbon bushing, such as formed from graphite. As another example, the end ring material 800 may comprise carbon fiber formed into the ring. In both of these examples, the non-braided and non-jacketed rings can provide for improved lubrication, improve tolerances, and mitigate extrusion of the seal materials. In these examples, the bushing or carbon fiber ring may not need to be cut in order to be operably placed on the stem. The respective end rings are formed to operably fit onto the stem (e.g., 600) without the use of a cut.

Figure 5:
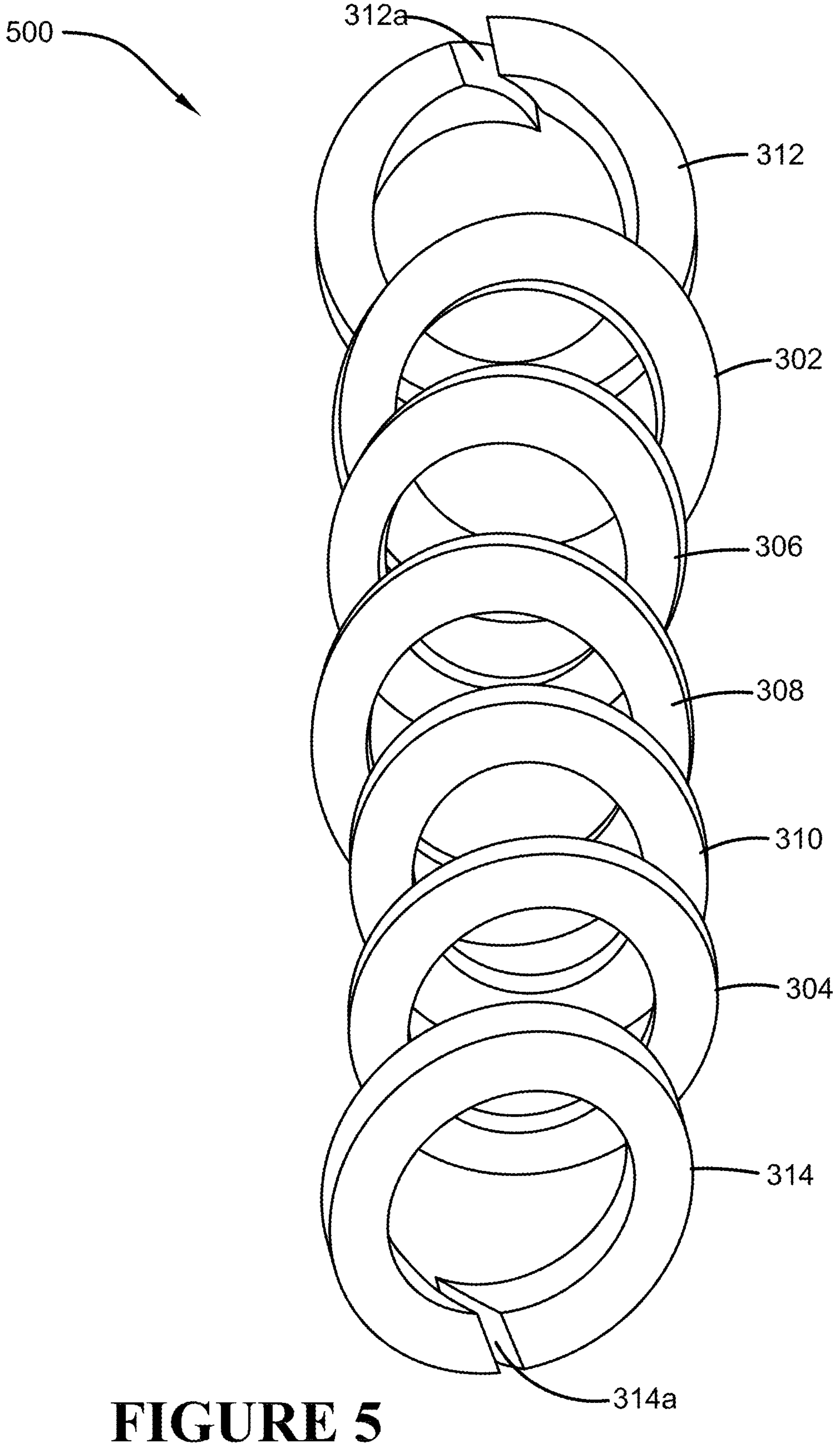
FIG. 5 is a component diagram illustrating an exploded-type view of an example packing ring system.

In one example, as illustrated in the implementation of FIG. 5, a valve packing ring system 500 is comprised of a top layer 302, a bottom layer 304, three mid-layers 306, 308, and 310, a first end ring 312, and a second end ring 314. In this example, the top layer 302 and bottom layer 304 can both be made of a flexible corrosion-inhibited graphite material. In this example, the mid-layers alternate materials with 306 and 308 made of metal and/or alternate polymer, and 304 made of a flexible corrosion-inhibited graphite material. In this example, the first end ring 312 and the second end ring 314 are made of a nickel alloy jacketed, braided, corrosion inhibited graphite with added non-fluoropolymer lubricant; or a carbon bushing or carbon fiber ring material. Alternately, one or more of the respective layers 302, 304, 306, 308, 310 may be comprised of the combined flexible corrosion-inhibited graphite material infused with the metal and/or alternate polymer material. As an example, unless all of the layers 302, 304, 306, 308, 310 are comprised of the combined materials, the respective layers 302, 304, 306, 308, 310 may be alternating, such as between a combined material and a graphite-based material.

That is, for example, in some implementations, packing ring layers 302, 304, 306, 308, 310 may be alternating materials of graphite, metal and/or alternate polymer, graphite, PFA, and graphite, respectively. In this example, the respective packing ring layers 302, 304, 306, 308, 310 can be contained at the top and bottom by the first end ring 312, and the second end ring 314, respectively, to form the example valve packing ring system 500 (e.g., or 300). In other implementations, the respective packing ring layers 302, 304, 306, 308, 310 may each be comprised of layers of combined flexible graphite-based material and metal and/or alternate polymer that have been bonded together (e.g., in a heat and/or pressure bonding process) to form a combined packing ring sheet.

As an illustrative example, as illustrated in FIGS. 7A, 7B, 7C, and 7D, an example ring packing system (e.g., seal) can be comprised of separate rings 700, 720 (e.g., a top layer 102, 302, a bottom layer 104 304, mid layers 106, 306, 308, 310). In some implementations, the respective packing rings 700, 720 can be comprised of either a graphite-based material or a metal and/or alternate polymer material. In this implementation, the packing rings 700, 720 can be formed into a ring, such as by bonding layers of the material together, shaping, forming, extrusion, stamping, etc. In other implementations, the respective packing rings 700, 720 may be formed from alternating sheets of a flexible graphite material and sheets of metal and/or alternate polymer material. In this implementation, the alternating sheets of different materials can be bonded together (e.g., in a heat and/or pressure process) to form a unitary packing ring of the combined materials. Further, example ring packing system (e.g., seal) can be comprised of separate end rings 750, 770. As described above, the end rings 750, 770 can be comprised of a flexible graphite material that is knitted over with a metal alloy wire jacketing. Additionally, each end ring 750, 770 can comprise a skive cut 750*a*, 770*a*, to facilitate fixing the rings to the target valve stem.

Figure 9A:
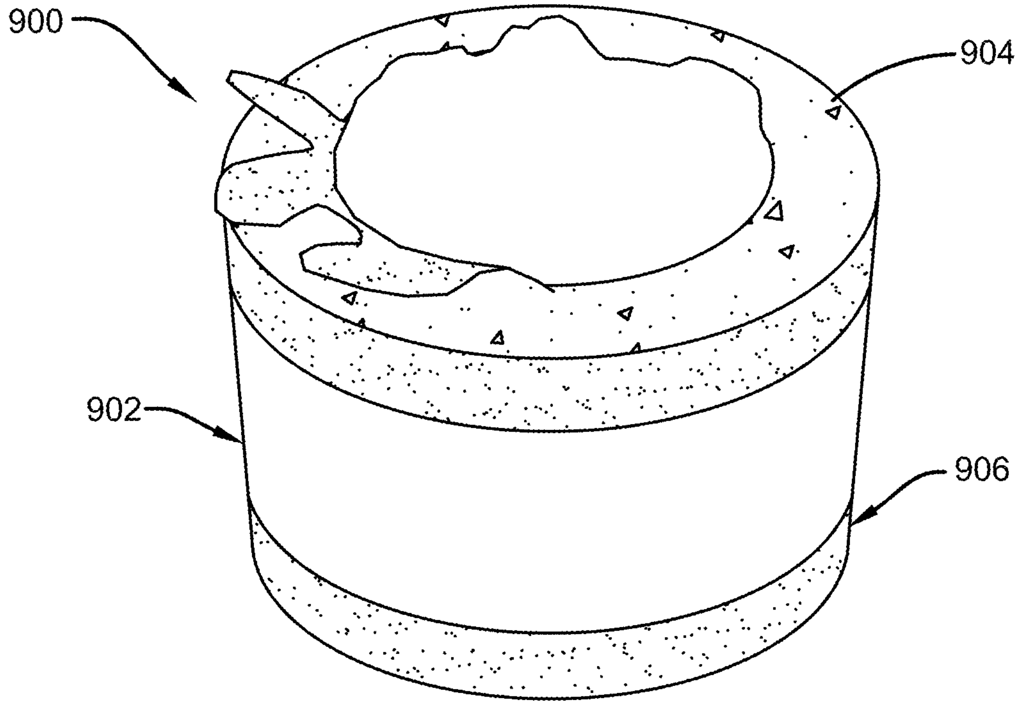
FIGS. 9A and 9B are photos of an example ring packing system in accordance with one or more implementations described herein.
Figure 9B:
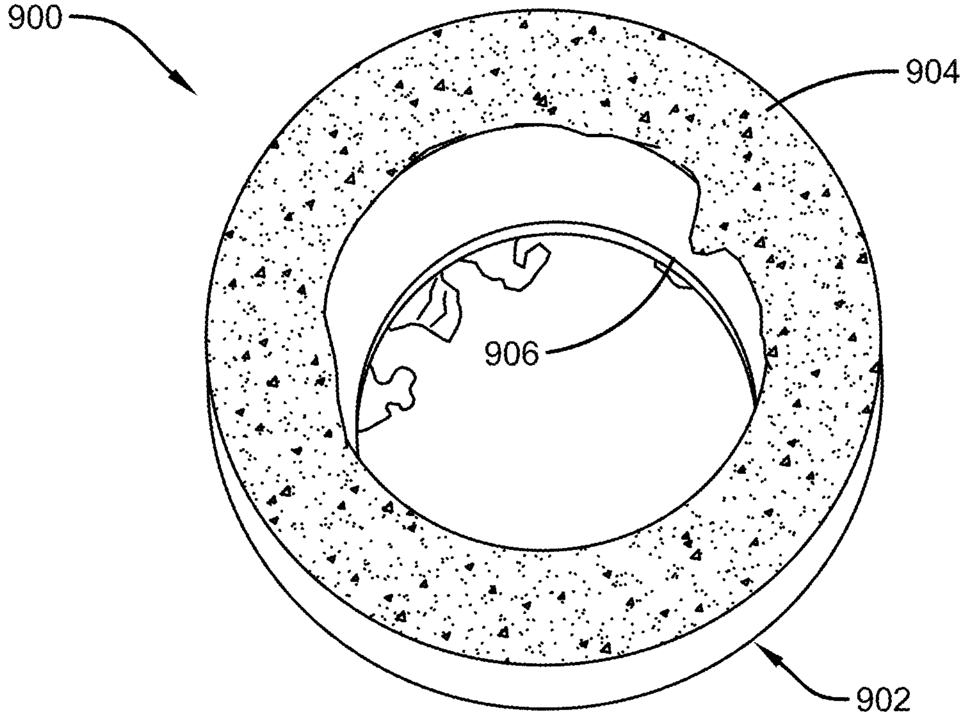

In another example, the implementation illustrated in FIGS. 2-5 may be manufactured. The packing system 300 may be manufactured by placing the top layer 302 on top of mid layers 306, putting mid layer 308 underneath mid-layer and 306, and putting mid-layer 310 underneath mid-layer 308, then placing the bottom layer 304 underneath the mid-layer 310. The layers 302, 304, 306, 308, and 310 may be lined up, and then each layer bonded together. The first end ring 312 and second end ring 314 may further be bonded to the top of the top layer 302 and underneath the bottom layer 304. As an illustrative example, as illustrated in FIGS. 9A and 9B, an example packing system 900 can comprise bonded layers (e.g., 302, 304, 306, 308, 310) of packing rings that form a body 902 of the packing system. Further, a first 904 and second 906 end ring can be combined with the body 902 to form the example packing system 900.

The top layer 302, bottom layer 304, mid layers 306, 308, and 310, and the first end ring 312 and second end ring 314 may be shaped and sized to create a seal around a valve stem. The top layer 302, bottom layer 304, mid layers 306, 308, and 310 may be sized similarly, to appropriately rest on top of each other. As just one example, the top layer 302, bottom layer 304, mid layers 306, 308, and 310 may be about 0.05 to about 0.25 (e.g., preferably about 0.16) inches in height/thickness each, and have about a 0.5 to about 1.5 (e.g., preferably about 1) inch inner diameter, and about a 1.0 to about 2.0 (e.g., preferably about 1.5) inch outer diameter. The first end ring 312 and the second end ring 314 may be sized similarly to the other layers to provide for even compression and containment of the inner layers. The first end ring 312 and the second end ring 314 may be the same size as the top layer 302, bottom layer 304, mid layers 306, 308, and 310, or it might be larger in size. For example, the first end ring 312 and the second end ring 314 may be about 0.1 to about 0.9 (e.g., preferably about 0.46) inches in height/thickness each.

Figure 6:
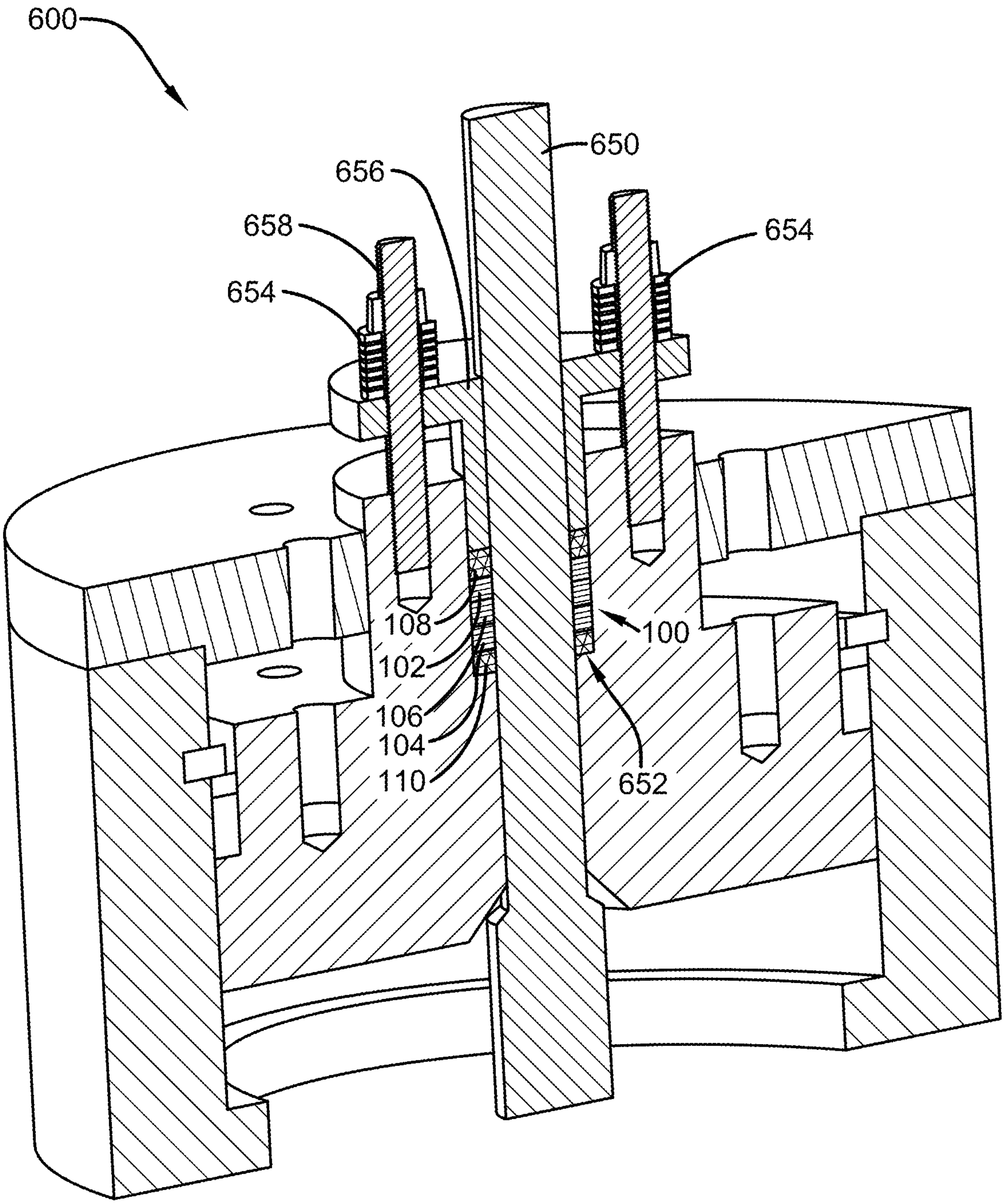
FIG. 6 is a cross-sectional view of a valve system where one or more portions of one or more packing ring system may be implemented.
Figure 7A:
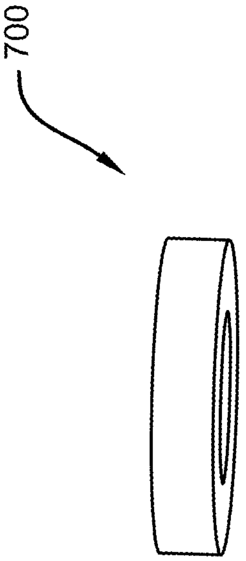
FIGS. 7A-7D are photos of an exemplary implementation of layers of a packing ring system.
Figure 7B:
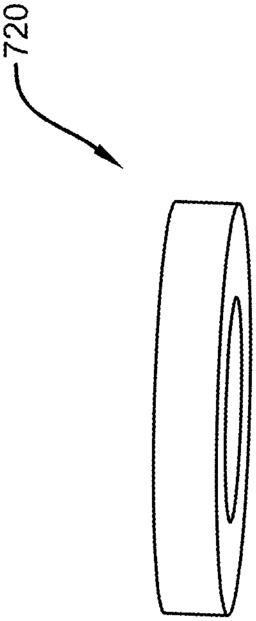
Figure 7C:
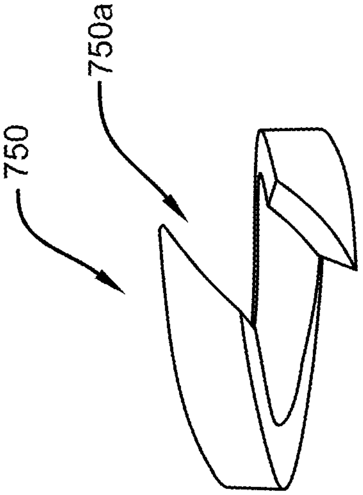
Figure 7D:
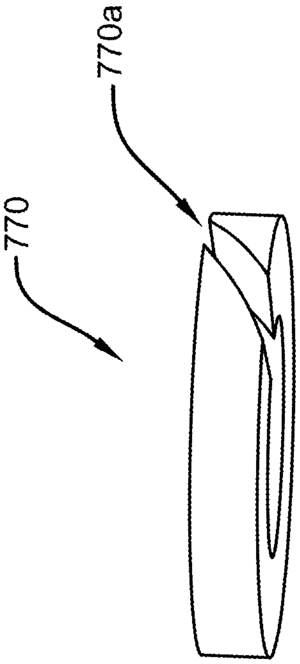

FIG. 6 is a component diagram illustrating an example environment of a valve system 600 where one or more portions of one or more systems described herein may be implemented. In this implementation, the valve system 600 comprises a valve stem 650, a stuffing box 652 (e.g., comprising internal walls), and a packing ring system 100. While the valve system 600 displays a sliding step valve system, a rotary shaft valve may also be employed. The packing ring system 100 may further have a top layer 102, a bottom layer 104, a mid-layer 106, a first end ring 108, and a second end ring 110. The valve system 600 may also have spring washers 654, (e.g., Belleville® springs), which can operably provide a selected amount of compressive force to the packing ring system 100, such as to improve and extend the performance of the packing ring system 100. That is, when the packing ring system 100 is installed in the packing box 652, a gland follower 656 is compressed onto the packing ring system 100 by threaded fasteners 658. Further, the spring washers 654 are disposed on the threaded fasteners 658 to provide for a desired, constant amount of compression. As an example, when compression is applied to the packing ring system 100 the respective layers expand radially toward the valve stem 650 and walls of the stuffing box 652. In this way, for example, an improved seal is provided for the valve system 600; and, for example, the polymer in the packing ring system 100 is carried by the graphite-based material to improve the seal and improve lubrication at the seal face.

The packing ring system 100 may form slight clearance or slight interference fit between the valve stem 650 and stuffing box 652, which enables the flexible graphite to seal and provide containment of metal and/or alternate polymer when compressed (e.g. by the gland follower 656). Slight clearance and/or slight interface fits may provide a better seal in part due to flexible graphite's low radial creep properties. The top layer 102, bottom layer 104, and mid layer 106 may exhibit low friction levels and be capable of squeezing, or exhibiting cold flow, under compression towards a valve stem 650. The clearance and the interference of the packing ring system 100 may influence the rate of leakage of fluid from inside the valve system to outside of the valve through the valve stem 650. As just one example, the clearance of the packing ring system 100 may be about 0.5% interface for 1.5% clearance of nominal value of the mating component. In one example, a 1.000 inch valve stem may have a 0.005 inch interface and a 0.015 inch clearance with the packing ring system. In another example, the clearance of the packing ring system 100 is about 0.005 inches to about 0.010 inches. In yet another example, the interference of the packing ring system 100 is about 0.005 inches to about 0.010 inches. It is anticipated that other clearance or interference values can be used with the systems described herein to provide similar sealing properties.

A packing ring system such as 100 or 300 when employed as a sealant to a valve system such as 600 may reduce leakage of fluid from inside the valve stem 650, to comply with various emission standards. For example, the emission standards may be compliant with the EPA Method 21, API 622, 624, 641, TA-LUFT, ISO 15848, and fugitive emission standards The packing ring system, such as 100 or 300, may also be compliant with fire safety tests, such as API 589, API 607, etc. In one such fire safety test, the valve system 600 and/or packing ring system 100 or 300 is exposed to high heat for a period of time and then tested for leakage post heat application. The packing ring system disclosed herein mitigates leakage of the target fluid from the valve at an improved rate over other packing ring systems currently in use in the industry, and also provides adequate fluid containment in the event of a fire.

In another embodiment, the packing ring system such as 100 or 300, may be made of any suitable material for valve sealants, such as graphite, graphite-based material and/or other membrane materials. The membrane materials include indium, aluminum, bismuth, gold, platinum, silver, copper, polyetheretherketone (PEEK), polybenzimidazole (PBI), polyetherimide (PEI), Polyphenylene sulfide (PPS), and Silicones. The chosen material may be selected based on desired properties. The membrane material may act as a fluid permeation barrier. The membrane materials may have advantages properties such as, elevated temperature resistance, chemical compatibility, low permeability, applied in a thickness less than 0.38 mm, able to flow when load is applied, high ductility, low softening point or low melting point, and non-toxic. The membrane material may be applied alone or in combination with multiple membrane materials.

In one example, a graphite-indium laminate material may be used to make the plurality of layers; mid-layers, top layers and/or bottom layers. The top layers and/or bottom layers may be Inconel jacketed graphite (e.g., braided), carbon bushings, carbon fiber rings, or capped with metal foil or an indium foil. The mid-layers may comprise flexible graphite material laminated with metal foil, combinations of metal foils, and/or with alternate polymers described herein (e.g., without PFA).

Figure 10A:
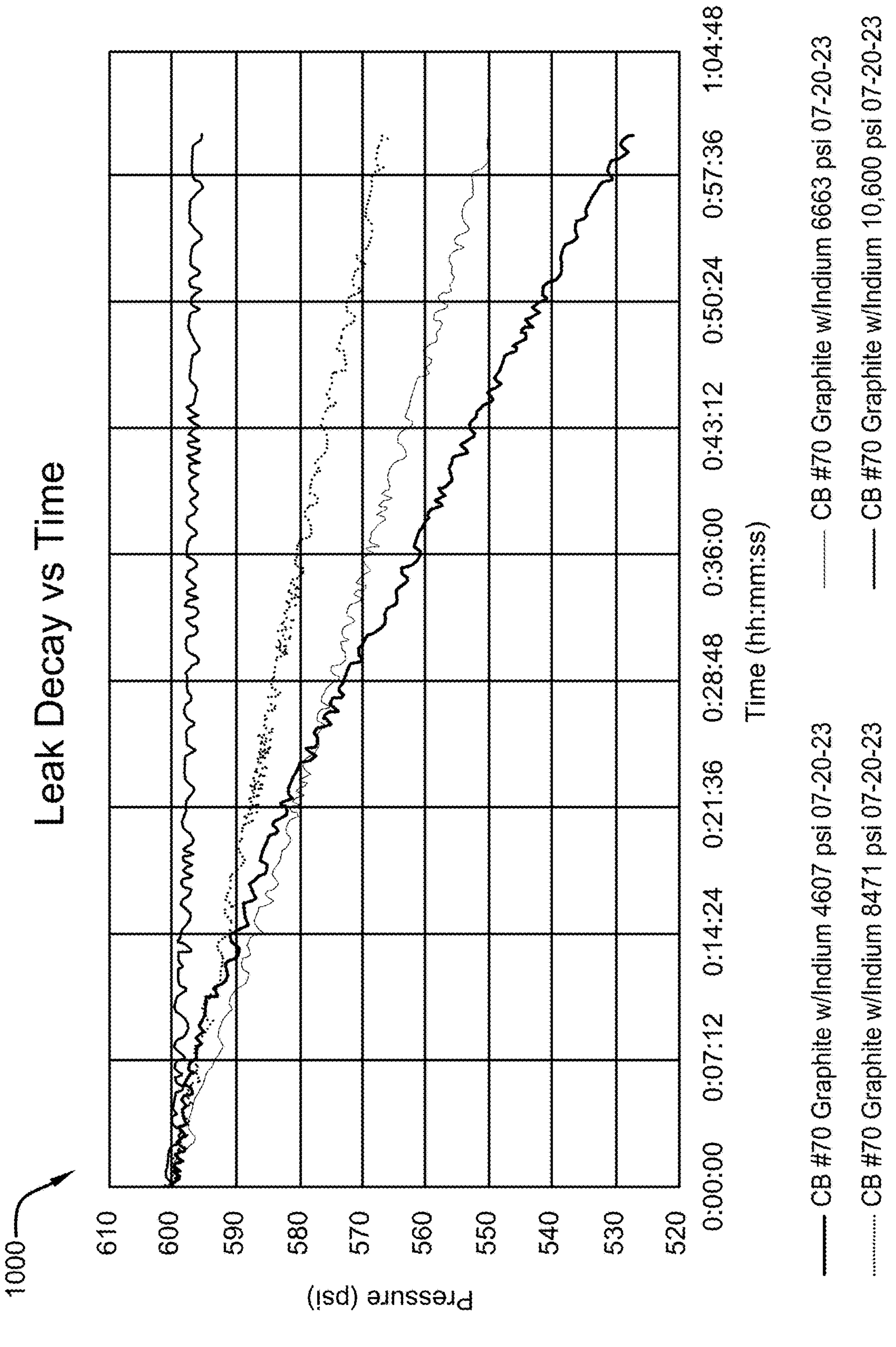
FIGS. 10A, 10B, and 10C are graphs illustrating examples of testing results for one or more seals described herein, along with comparison seals.
Figure 10B:
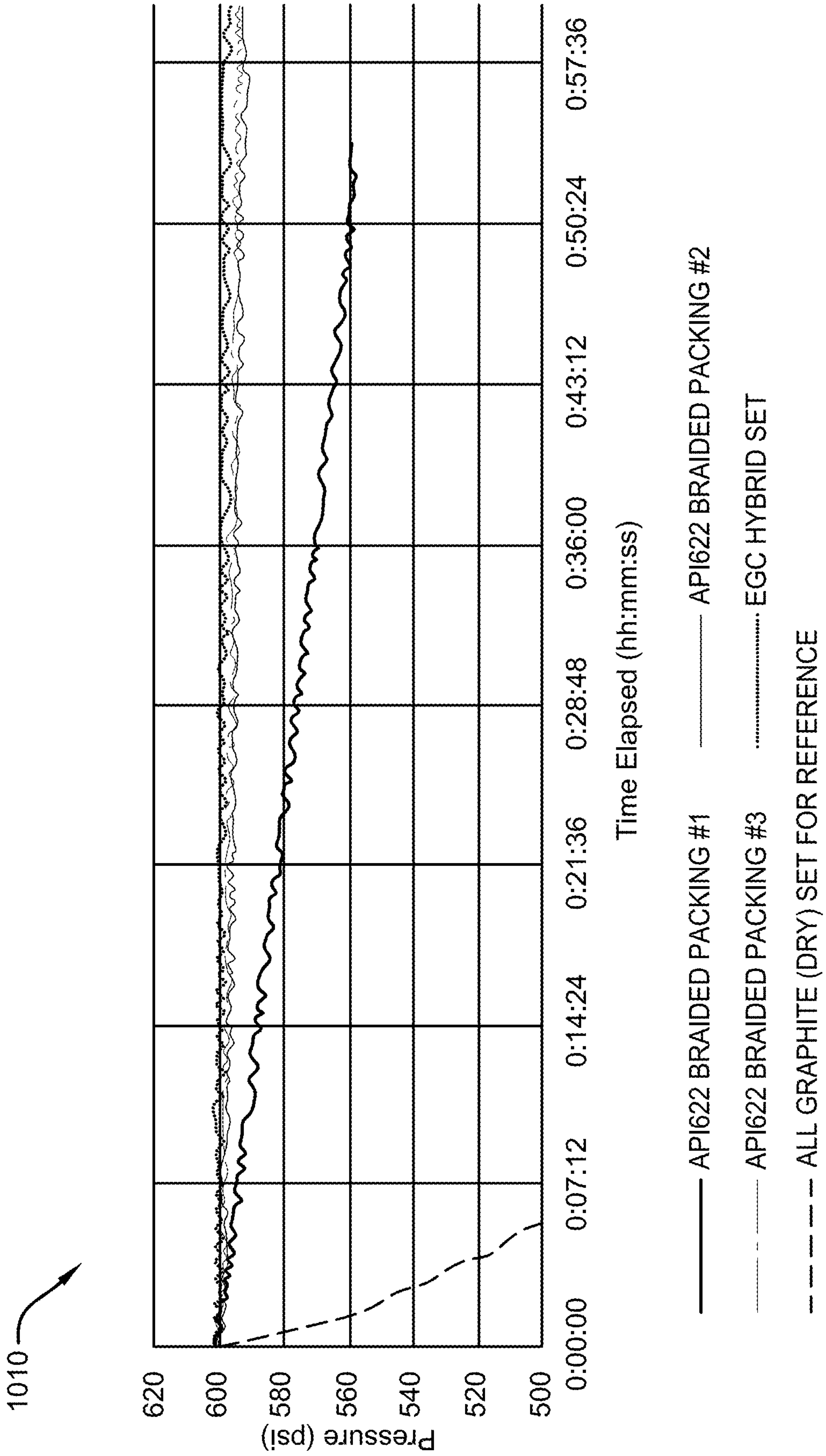
Figure 10C:
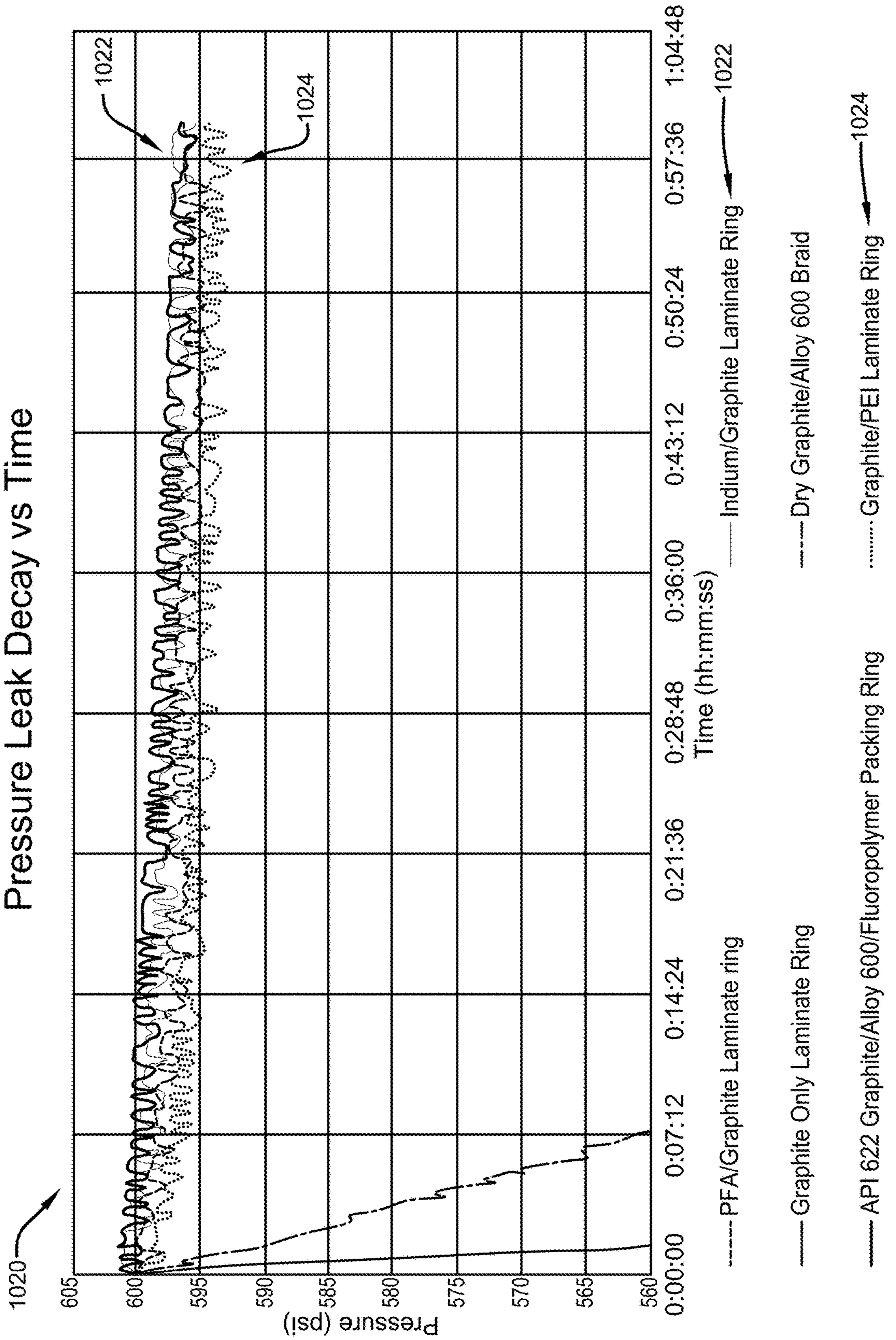

As an example, some preliminary experimental data on an Indium/graphite laminate illustrates that an indium and graphite laminate may be used to make the center rings of the packing set described herein. In this example, the data suggests that some of the loading requirements may be increased to achieve the desired sealability. Further, in order to achieve a fluoropolymer free packing set, the end rings may not include PTFE or any other fluoropolymer. Instead, in this example, they can be formed from a Inconel jacketed graphite or capped with metal foil. Some data on the new center ring laminate is illustrated in FIGS. 10A, 10B, and 10C. In FIG. 10A, the graph 1000 illustrates pressure loss over time for various combinations of indium and graphite layers in the seal. This indicative of leak decay for a seal over time. In FIG. 10B, the graph 1010 also illustrates pressure loss over time for various combinations of existing packing layers in the seal, for comparison. This indicative of leak decay for the seal over time.

Figure 11A:
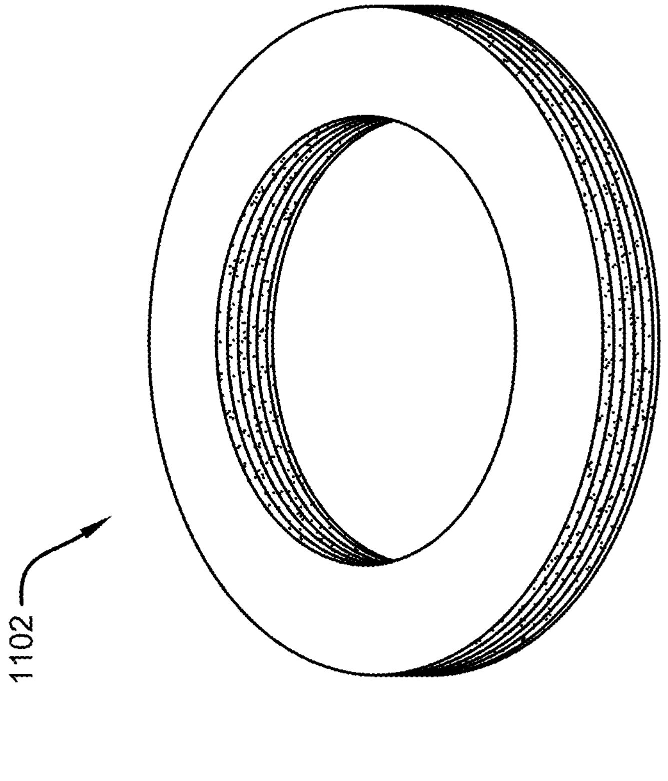
FIGS. 11A and 11B are photos of an example ring packing system in accordance with one or more implementations described herein.
Figure 11B:
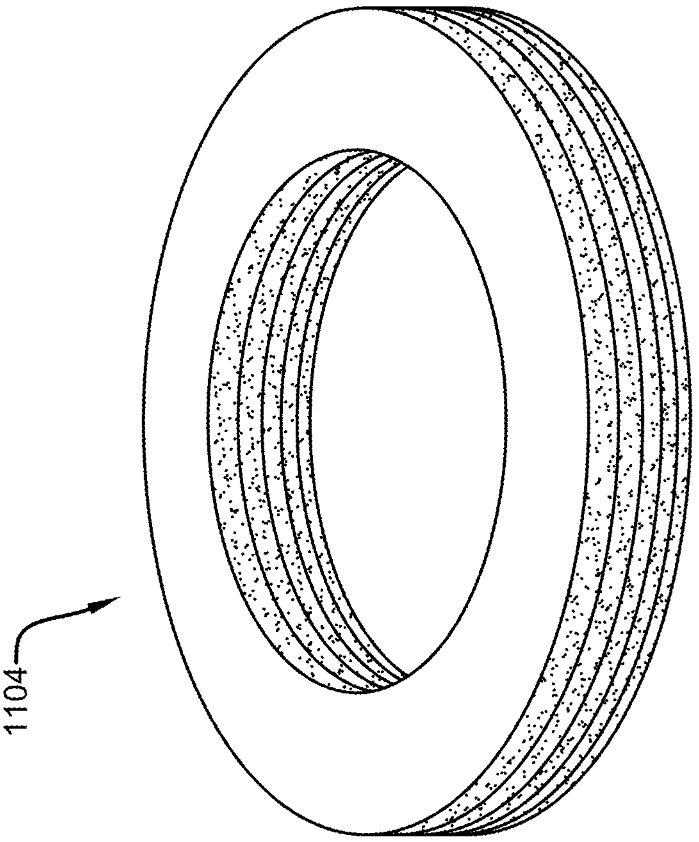

In FIG. 10C, the graph 1020 illustrates pressure loss over time for a indium/graphite laminate ring 1022, and a PEI/Graphite laminate ring 1024. Further, FIGS. 11A and 11B are photos of an example, Indium/Graphite laminate ring 1102, and an example PEI/Graphite laminate ring 1104.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. Of course, those skilled in the art will recognize many modifications may be made to this configuration without departing from the scope or spirit of the claimed subject matter.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure.

In addition, while a particular feature of the disclosure may have been disclosed with respect to only one of several implementations, such feature may be combined with one or more other features of the other implementations as may be desired and advantageous for any given or particular application. Furthermore, to the extent that the terms "includes," "having," "has," "with," or variants thereof are used in either the detailed description or the claims, such terms are intended to be inclusive in a manner similar to the term "comprising."

The implementations have been described, hereinabove. It will be apparent to those skilled in the art that the above methods and apparatuses may incorporate changes and modifications without departing from the general scope of this invention. It is intended to include all such modifications and alterations in so far as they come within the scope of the appended claims or the equivalents thereof.

What is claimed is:

1. A packing ring for a fluid valve comprising:

a top layer and a bottom layer, both the top layer and the bottom layer comprising a flexible graphite material; and one or more mid-layers comprising a membrane material, or the flexible graphite material and the membrane material, wherein the membrane material is a non-fluoropolymer material comprising at least one of indium, aluminum, bismuth, gold, platinum, silver, copper, polyetheretherketone (PEEK), polybenzimidazole (PBI), polyetherimide (PEI), Polyphenylene sulfide (PPS), and a silicone, wherein the membrane material comprises a thickness of less than or equal to 0.015 inches and is bonded to an adjacent layer of the flexible graphite material to form a laminate, and wherein the membrane material acts as a fluid permeation barrier that flows when load is applied;

wherein the one or more mid-layers are disposed between the top layer and the bottom layer;

wherein respective one or more mid-layers are disposed parallel to an adjoining layer;

wherein the one or more mid-layers, top layer, and bottom layer are bonded together forming a cylindrical shape; and wherein the cylindrical shape comprises an open center, wherein the open center extends through the formed cylindrical shape, and has an axis perpendicular to the one or more mid-layers, top layer, and bottom layer.

2. The packing ring of claim 1, wherein the open center is fixed to operably dispose the respective layers in contact with a target valve stem in a valve body stuffing box, and form a clearance or interference fit between the valve stem and the stuffing box.

3. The packing ring of claim 1, further comprising a first end ring and a second end ring, the first end ring disposed on top of the top layer, and the second end ring disposed below the bottom layer.

4. The packing ring of claim 3, wherein the first end ring and the second end ring comprise the flexible graphite material knitted over with metal alloy wire jacketing.

5. The packing ring of claim 3, wherein the first end ring and second end ring comprise die formed anti-galling material.

6. The packing ring of claim 3, wherein the first end ring and second end ring are comprised of a die molded packing ring with formed metal foil cap anti-extrusion device.

7. The packing ring of claim 3, wherein the first end ring and second end ring are comprised of a non-flexible carbon bushing.

8. The packing ring of claim 3, wherein the first end ring and second end ring are comprised of a carbon fiber ring.

9. The packing ring of claim 2, wherein the clearance of the fit between the bonded one or more mid-layers, top layer, and bottom layer and the stuffing box is about 0.005 inches.

10. The packing ring of claim 1, wherein the graphite material comprises a corrosion-inhibited graphite material, and comprises a height/width of about 0.015 inches.

11. The packing ring of claim 1, wherein the membrane material comprises a height/width of about 0.0025 inches.

12. The packing ring of claim 1, wherein the mid layers comprise 3-40% membrane by weight.

13. A sealing system for a fluid valve comprising:

a packing ring comprising one or more mid-layers, respective mid-layers comprising a flexible corrosion-inhibited graphite material and a membrane material, wherein the membrane material is a non-fluoropolymer material comprising at least one of indium, aluminum, bismuth, gold, platinum, silver, copper, polyetheretherketone (PEEK), polybenzimidazole (PBI), polyetherimide (PEI), Polyphenylene sulfide (PPS), and a silicone, wherein the membrane material comprises a thickness of less than or equal to 0.015 inches and is bonded to an adjacent layer of the flexible graphite material to form a laminate, and wherein the membrane material acts as a fluid permeation barrier that flows when load is applied;

a top layer and a bottom layer, both the top layer and the bottom layer comprising a flexible graphite material;

wherein the one or more mid-layers are disposed between the top layer and the bottom layer, and the mid-layers comprise alternating layers of the flexible graphite material and the membrane material;

wherein respective layers are disposed parallel to an adjoining layer;

wherein the packing ring is cylindrical in shape with an open center, the open center extending through the one or more mid-layers, top layer, and bottom layer, and having an axis perpendicular to the one or more mid-layers, top layer, and bottom layer; and a valve stem, wherein the valve stem extends through the open center and the packing ring forms an interference fit between the valve stem and a stuffing box in which the valve stem is disposed.

14. The packing ring of claim 13, wherein the valve stem is about 1 inch in diameter, and a fitment between the packing ring and the stuffing box is about 0.5% of the diameter of a stem interference to 1.5% of the diameter of a stem clearance, or is about 0.005 inches interference to about 0.015 inches clearance.

15. The packing ring of claims 14, wherein the packing ring further comprises a first end ring and a second end ring, the first end ring disposed on top of the packing ring and the second end ring disposed on bottom of the packing ring.

16. The packing ring of claim 15, wherein the first end ring and the second end ring comprise one of:

the flexible graphite material knitted over with a metal alloy wire jacketing:

a non-flexible carbon bushing; or a carbon fiber ring.

17. A packing ring for a fluid valve comprising:

a top layer and a bottom layer; and one or more mid-layers comprising a membrane material, or a flexible graphite material and the membrane material, wherein the membrane material is a non-fluoropolymer material comprising at least one of polyetheretherketone (PEEK), polybenzimidazole (PBI), polyetherimide (PEI), Polyphenylene sulfide (PPS), and a silicone, wherein the membrane material comprises a thickness of less than or equal to 0.015 inches and is bonded to an adjacent layer of the flexible graphite material to form a laminate, and wherein the membrane material acts as a fluid permeation barrier that flows when load is applied;

wherein the one or more mid-layers are disposed between the top layer and the bottom layer;

wherein the one or more mid-layers, top layer, and bottom layer are bonded together forming a substantially cylindrical shape; and wherein the cylindrical shape comprises an open center, wherein the open center extends through the formed cylindrical shape, and has an axis perpendicular to the one or more mid-layers, top layer, and bottom layer.

18. The packing ring of claim 1, wherein the one or more mid-layers comprise the flexible graphite material and the membrane material.

19. The packing ring of claim 18, wherein the respective one or more mid-layers comprise alternating layers of the flexible graphite material and the membrane material.

20. The packing ring of claim 18, wherein the respective one or more mid-layers comprise one layer of the membrane material.

21. The packing ring of claim 18, wherein the respective one or more mid-layers comprise two layers of the membrane material and one layer of the flexible graphite material, and wherein the flexible graphite material is oriented perpendicular to the axis of the cylindrical shape.

22. The packing ring of claim 18, wherein the one or more mid-layers and/or the top layer and/or the bottom layer are comprised of a combination of the flexible graphite material and the membrane material that are fused together by a heat treatment, and wherein the flexible graphite material is oriented perpendicular to the axis or the cylindrical shape.

* * * * *